US010306431B1

United States Patent
Inciong et al.

(10) Patent No.: US 10,306,431 B1
(45) Date of Patent: *May 28, 2019

(54) CONNECTED SERVICES CONFIGURATOR FOR CONNECTING A MOBILE DEVICE TO APPLICATIONS TO PERFORM TASKS

(71) Applicant: Allstate Insurance Company, Northbrook, IL (US)

(72) Inventors: Sarah Inciong, Dundee, IL (US); Edward A. Biemer, Eastbourne (GB)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/020,041

(22) Filed: Jun. 27, 2018

Related U.S. Application Data

(63) Continuation of application No. 15/785,629, filed on Oct. 17, 2017, now Pat. No. 10,038,986, which is a
(Continued)

(51) Int. Cl.
*G06F 15/16* (2006.01)
*H04W 4/44* (2018.01)
(Continued)

(52) U.S. Cl.
CPC ............. *H04W 4/44* (2018.02); *H04L 67/12* (2013.01); *H04M 1/72566* (2013.01); *H04W 4/027* (2013.01); *H04W 4/029* (2018.02)

(58) Field of Classification Search
CPC ............ G01C 21/3617; G01C 21/3484; G08G 1/0112; G08G 1/096844
(Continued)

(56) References Cited

U.S. PATENT DOCUMENTS 6,711,474 B1   3/2004   Treyz et al.
8,068,977 B2   11/2011  Ozawa et al.
(Continued)

FOREIGN PATENT DOCUMENTS

EP   1944578 A2   7/2008
EP   2758879 A2   7/2014
(Continued)

OTHER PUBLICATIONS

Vijayan, Computerworld, Usage-based auto insurance found to pose privacy risks, 2 pages, dated 2014.
(Continued)

*Primary Examiner* — Sam Bhattacharya
(74) *Attorney, Agent, or Firm* — Banner & Witcoff, Ltd.

(57) ABSTRACT

A system may include a telematics device associated with a vehicle, a first computing device associated with a driver of the vehicle, and a server. The server may receive, from the telematics device or another device, driving behavior data, a vehicle location, and a time corresponding to the vehicle location, and parse data regarding a driver's calendar in order to identify a scheduled meeting or event and a location and/or time associated therewith. Further, the server may estimate a time of arrival at which the vehicle will arrive at the meeting or event location, determine whether or not the driver will be late to the meeting or event, and take action as appropriate.

20 Claims, 8 Drawing Sheets

Related U.S. Application Data continuation of application No. 14/887,945, filed on Oct. 20, 2015, now Pat. No. 9,820,108.

(51) Int. Cl.
*H04M 1/725* (2006.01)
*H04W 4/02* (2018.01)
*H04W 4/029* (2018.01)
*H04L 29/08* (2006.01)

(58) Field of Classification Search
USPC .......... 455/414.1, 416; 701/29.6, 400, 408, 701/456.3; 705/14.63, 35
See application file for complete search history.

(56) References Cited

U.S. PATENT DOCUMENTS

| | | | |
|---|---|---|---|
| 8,392,116 B2 | 3/2013 | Lehmann et al. | |
| 8,478,642 B2 | 7/2013 | Dey et al. | |
| 8,560,161 B1 | 10/2013 | Kator et al. | |
| 8,688,290 B2 | 4/2014 | Jotanotivc | |
| 8,725,612 B2 | 5/2014 | Mundinger et al. | |
| 8,805,707 B2 | 8/2014 | Schumann, Jr. et al. | |
| 9,241,073 B1 * | 1/2016 | van Rensburg ....... | H04M 3/382 |
| 2006/0083357 A1 | 4/2006 | Howell et al. | |
| 2011/0161001 A1 | 6/2011 | Fink | |
| 2013/0158855 A1 | 6/2013 | Weir et al. | |
| 2013/0289819 A1 | 10/2013 | Assib et al. | |
| 2014/0089101 A1 | 3/2014 | Meller | |
| 2014/0120952 A1 | 5/2014 | Freeman et al. | |
| 2014/0129080 A1 | 5/2014 | Leibowitz et al. | |
| 2014/0139655 A1 | 5/2014 | Mimar | |
| 2014/0278071 A1 | 9/2014 | San Filippo et al. | |

FOREIGN PATENT DOCUMENTS

| | | |
|---|---|---|
| WO | 2013134863 A1 | 9/2013 |
| WO | 2014047695 A2 | 4/2014 |
| WO | 2014106854 A2 | 7/2014 |

OTHER PUBLICATIONS

Caa, There's an App for That!, 2 pages, dated Oct. 15, 2014.
Jarvis, Intelligent Sensor Based Road Vehicle Driver Assistance, Intelligent Robotics Research Centre, Monash University, 6 pages, date unknown, but assumed prior to the filing of this application.
Ford, News Center, Sensing the Future: Ford Issues Predictions for Next Wave of Automotive Electronics Innovation, 2 pages, date unknown, but assumed prior to the filing of this application.
Mubaloo Enterprise Mobility, Insurance Mobility: the vision, 14 pages, date unknown, but assumed prior to the filing of this application.
Di Lorenzo et al, MIT Open Access Articles, An affective intelligent driving agent: driver's trajectory and activities prediction, 6 pages, date unknown, but assumed prior to the filing of this application.
Simmons et al, Learning to Predict Driver Route and Destination Intent, 6 pages, date unknown, but assumed prior to the filing of this application.
Mar. 23, 2017—(US) Office Action—U.S. Appl. No. 14/887,945.
Jul. 13, 2017—(US) Notice of Allowance—U.S. Appl. No. 14/887,945.
Nov. 30, 2017—(US) Non-Final Office Action—U.S. Appl. No. 15/785,629.
Mar. 27, 2018—(US) Notice of Allowance—U.S. Appl. No. 15/785,629.

* cited by examiner

FIG. 8A

CONNECTED SERVICES

ACCOUNT INFO

Account holder: Jack Smith

Insured individuals: Jane Smith, John Smith

Insurance policy number: XXXXXXX
Insurance coverage: XXX
Premiums XXXX
Connected services program: XXXXX Billing information
Payment history Edit information

FIG. 8B

CONNECTED SERVICES

PREFERENCES

Select preference(s):

☐ Sync calendar, tasks, and reminders with connected services app
☐ Receive meeting reminders and estimated arrival times
☐ Notify meeting attendees if late by 1 hour automatically.
  ☐ Email
  ☐ Text Message
  ☐ Phone Call
☐ Automatically initiate conference call if late to meeting Edit preferences

CONNECTED SERVICES CONFIGURATOR FOR CONNECTING A MOBILE DEVICE TO APPLICATIONS TO PERFORM TASKS

CROSS-REFERENCE TO RELATED APPLICATIONS

This application is a continuation of and claims priority to U.S. patent application Ser. No. 15/785,629, filed on Oct. 17, 2017 and entitled "CONNECTED SERVICES CONFIGURATOR," which is a continuation of and claims priority to U.S. patent application Ser. No. 14/887,945, filed on Oct. 20, 2015 and entitled "CONNECTED SERVICES CONFIGURATOR." The aforementioned applications are hereby incorporated by reference herein in their entirety.

BACKGROUND

Mobile devices, such as smartphones, tablet computers, and other types of mobile computing devices, are becoming increasingly popular for a variety of purposes. In some cases, mobile devices, such as smartphones, make people's lives easier by allowing them to connect with various applications and complete different tasks quickly. For example, users may employ mobile devices in personal and business settings to manage their work, connect with others, manage finances, participate in social media, play games, navigate to various destinations, and the like. Such tasks are made possible thanks to a variety of mobile applications (e.g., applications designed specifically for use with specially designed mobile device operating systems) and back-end systems provided by various sources. The number of mobile applications and tasks that may be accomplished using such mobile applications continues to grow. Unfortunately, many of the mobile applications require users to enter a relatively large amount of information and/or are not able to learn from the user's behaviors or environment. In particular, the process of entering information deters many users from using certain mobile applications. As a result, many mobile device users do not take full advantage of the capabilities of their mobile devices.

Meanwhile, some people, in an effort to take advantage of the many capabilities of their mobile devices, find themselves using their mobile devices while driving their vehicles. The use of mobile devices while driving may cause drivers to become distracted from driving and may therefore lead to dangerous situations. For example, a driver trying to update a calendar on his phone may become distracted while entering information into the phone and cause an accident. Accidents, of course, may be detrimental to the driver's health as well as the driver's financial well-being as the driver may have to pay for damages as a result of the accident. Insurance providers, who may be responsible for covering certain damages resulting from the accident, may also be financially harmed.

In light of the above, there may be a demand for new systems, methods, and devices that leverage the capabilities of a mobile device to automatically connect with certain services to perform certain tasks while a person is driving.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing computerized methods, systems, devices, and apparatuses for a connected services configurator that integrates various services and allows drivers to focus on safe driving. For example, each user may be able to interface with his or her calendar, traffic information, maps, driving behavior information, telematics information, and the like through a connected services mobile application on the user's mobile device. The connected services configurator may provide users with an intuitive access to connected car services and features in order to ultimately enhance each user's driving experience. The disclosure describes a system comprising a telematics device associated with a vehicle, a first computing device associated with a driver of the vehicle, and a server comprising hardware including a processor and memory. The server may be configured to receive, from the telematics device, driving behavior data, a vehicle location, and a time corresponding to the vehicle location, parse data regarding a calendar of the driver in order to identify a scheduled meeting, a meeting location, and a meeting time for the driver, based on the driving behavior data, the vehicle location, and the time corresponding to the vehicle location, estimate a time of arrival at which the vehicle will arrive at the meeting location for the scheduled meeting, determine whether the estimated time of arrival at the meeting location is after the meeting time, and after determining that the estimated time of arrival is after the meeting time, identify a phone number associated with the scheduled meeting. In some embodiments, the server may be further configured to identify an upcoming meeting and analyze a driving history of the driver to determine an average time it takes the driver to reach a particular location associated with the upcoming meeting. Based on the average time, the server may then notify the driver of a particular time that the driver should depart for the upcoming meeting in order to make it to the upcoming meeting on time.

The disclosure also describes an apparatus comprising at least one processor, a network interface configured to communicate, via a network, with a telematics device and a first computing device, and a memory storing computer-readable instructions that, when executed by the at least one processor, cause the apparatus to receive, from the telematics device, driving behavior data for a driver of a vehicle, a vehicle location, and a time corresponding to the vehicle location, parse data regarding a calendar of the driver in order to identify a scheduled meeting, a meeting location, and a meeting time for the driver, based on the driving behavior data, the vehicle location, and the time corresponding to the vehicle location, estimate a time of arrival at which the vehicle will arrive at the meeting location for the scheduled meeting, determine whether the estimated time of arrival at the meeting location is after the meeting time, and after determining that the estimated time of arrival is after the meeting time, identify a phone number associated with the scheduled meeting.

In addition, aspects of this disclosure provide a method that includes receiving, from the telematics device associated with a vehicle, driving behavior data for a driver of the vehicle, a vehicle location, and a time corresponding to the vehicle location, evaluating, by one or more computing devices, a calendar of the driver in order to identify a scheduled event, an event location, and a start time of the event, based on the driving behavior data, the vehicle location, and the time corresponding to the vehicle location, estimating, by the one or more computing devices, a time of arrival at which the vehicle will arrive at the event location, determining, by the one or more computing devices, whether or not the estimated time of arrival at the event location is after the start time of the event, and after determining that the estimated time of arrival is after the start time, identifying, by the one or more computing devices, contact information of a person associated with the event.

Of course, the methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example, and is not limited, by the accompanying figures in which like reference numerals indicate similar elements and in which:

FIGS. 8A and 8B depict example user interfaces of a connected services configurator application in accordance with one or more example embodiments.

DETAILED DESCRIPTION

Figure 1:
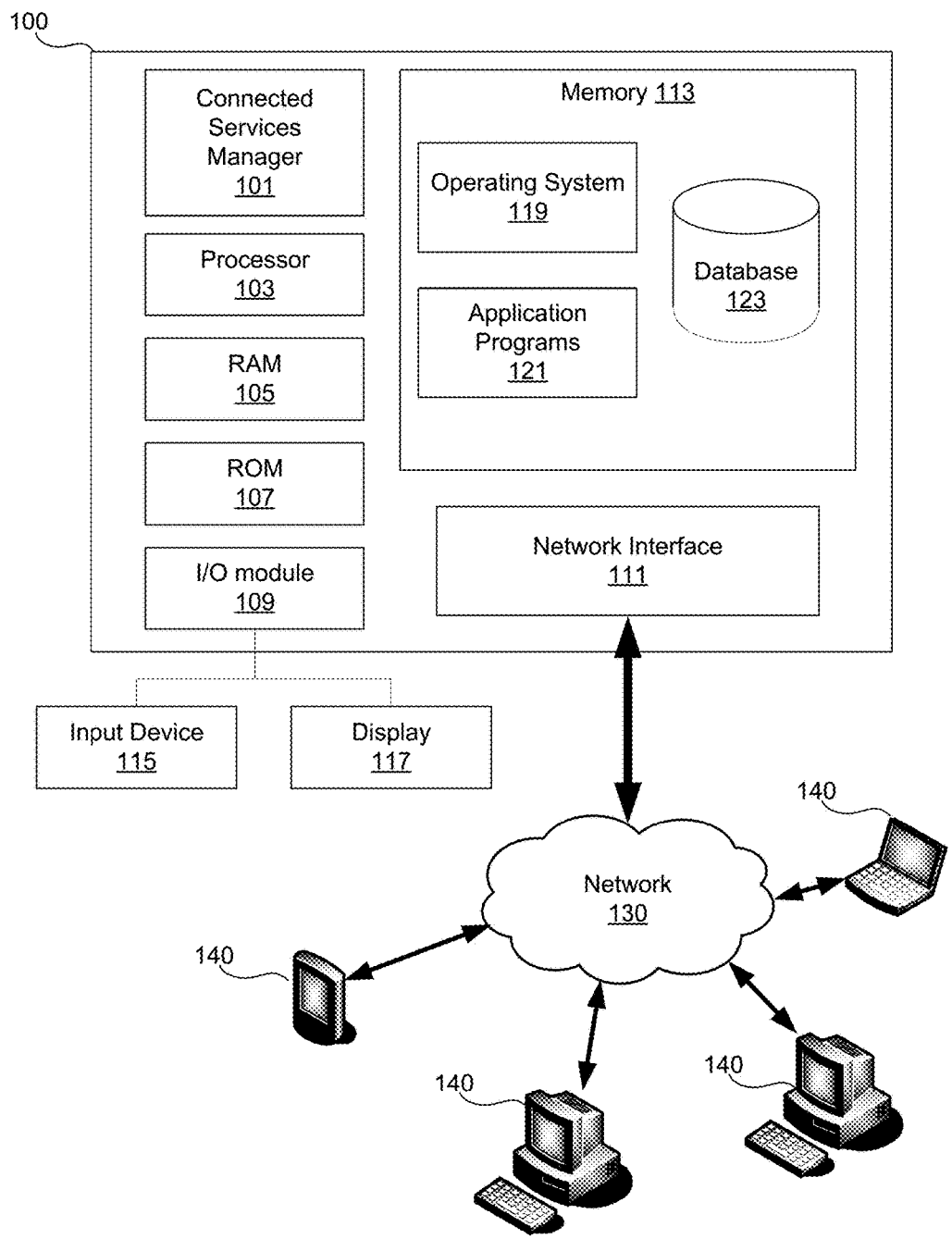
FIG. 1 depicts a block diagram of an example connected services device that may be used in accordance with one or more example embodiments.

In accordance with various aspects of the disclosure, computerized methods, systems, devices, and apparatuses are disclosed that provide a connected services configurator for receiving and analyzing driving behavior data for a driver of a vehicle, the driver's current location, and a current time corresponding to the current location, checking the driver's calendar to identify one or more scheduled meetings, meeting locations, and meeting times, estimating when the driver will arrive at a meeting location for a scheduled meeting based on the driving behavior data, current location, and the current time, determining whether the driver will arrive at the meeting location on time or be late for the scheduled meeting, and identifying a phone number for the scheduled meeting after determining that the driver will be late. In some embodiments, the connected services configurator may be referred to as a connected services system or a connected services manager as described herein.

In particular, the present disclosure teaches a connected services system that may be beneficial for allowing drivers to interact and engage safely with various services on their mobile devices through a connected services mobile application while driving. The connected services system may be integrated across a plurality of platforms and may be deployed by an insurance company that offers connected services and benefits to drivers (e.g., insurance policy holders). That is, the insurance company may offer connected services or benefits to drivers who are insurance policy holders with registered accounts, wherein the drivers may have opted in for the connected services program. In some cases, the insurance company may offer limited connected services to drivers without registered accounts (e.g., non-customers) as a way of incentivizing the drivers to become insurance policy holders.

The connected services system may allow users to connect safely to various services through their mobile devices while driving. The connected services system may collect a user's driving behavior data from a telematics device in the user's vehicle and integrate and provide various services on the user's mobile device, which are customized according to the collected telematics data. For example, the connected services system may customize and manage calendar information, traffic information, map or navigation information, and other services through the user's mobile device based on the collected driving behavior data and telematics data. Driving behavior data may include real-time data that is collected by sensors (e.g., accelerometer, GPS, gyroscope, and the like), a telematics device, and/or computing device in the vehicle driven by the driver and may include driving history data formed by collecting such real-time data over a period of time. For example, driving behaviors may be based on a driver's speed, acceleration, braking, steering, turn signals, number of miles driven for a trip, amount of time driven or trip duration, road condition ratings, and the like.

Based on the collected data, the connected services system may provide a customized response for a particular service through the user's mobile device. For example, the connected services system may be integrated with various applications on the user's mobile device, such as the user's calendar, tasks, reminders, map, traffic and navigation application, roadside assistance services, and the like. The connected services system may collect driving behavior data, use the collected data to make a determination for one or more various applications or services on the user's mobile device, and perform a task based on the determination. For example, the connected services system may collect driving behavior data for a driver and determine the vehicle's current location via GPS. The connected services system may also access a calendar of the driver and parse data to identify that a driver has a scheduled meeting in his or her calendar. That is, the driver may have a calendar with a schedule of meetings, including times and locations of each meeting. For example, the calendar may include descriptions and addresses for each scheduled meeting in the driver's calendar.

Scheduled meetings in the driver's calendar may include any meetings or appointments, such as meetings at work (e.g., team meetings, conference calls, video or teleconferences, etc.), lunch appointments, doctors' appointments, parent-teacher meetings, and the like. Scheduled meetings in the driver's calendar may also include any errands or tasks in the driver's calendar. For example, a driver may schedule times in his or her calendar as reminders to attend different events or perform various tasks, such as picking up food for dinner on his or her way home from work, dropping off and/or picking up his or her kids (e.g., at or from school, a soccer game, dance recital, band practice, and the like), taking his or her vehicle to a repair shop or car dealership for maintenance (e.g., oil changes, tire rotations, car repairs, etc.) and the like. The connected services system may check the driver's calendar and determine that the driver has an upcoming scheduled meeting, event, or task reminder at a specific time and location. In some cases, the connected services system may be able to recognize a route that the driver is taking and identify a meeting location to which the driver is heading (e.g., work, home, school, doctor's office, or the like). The connected services system may be able to recognize a meeting location based on previous locations to which the driver has driven. For example, the connected services system may be able to keep track of frequent locations to which the driver has previously traveled in a period of time (e.g., in the past three days, week, month, or another period of time) and check the driver's calendar to verify the meeting location and time.

Based on the collected driving behavior data, the vehicle's current location, and the time of the vehicle's current location, the connected services system may estimate a time of arrival at which the vehicle will arrive at the location of the scheduled meeting. That is, the connected services system may calculate how long it will take for the driver to reach the meeting location based on the driver's current location, the driver's previous and current speeds, the distance between the current location and the meeting location, the amount of traffic in the driver's route (e.g., if the driver is traveling during rush hour or during midday), number of traffic signals on the driver's route (e.g., traffic lights, stop signs, etc.), speed limits on the driver's routes, and the like. Information used to make this calculation may be obtained from one or more third party servers/applications (e.g., an expected duration of a trip may be obtained from GOOGLE Maps while weather information may be obtained from a local news station). After estimating the driver's time of arrival at the meeting location, the connected services system may determine if the time of arrival is after the meeting time for the scheduled meeting. For example, the driver may be driving below the speed limit or stuck in traffic during rush hour while headed to work for a meeting. Depending on how far the driver is from the meeting location, the current time, the meeting time for the scheduled meeting, and other factors, the connected services system may determine that the driver will be late for the scheduled meeting.

After determining that the estimated time of arrival at the meeting location is after the meeting, the connected services system may identify a phone number associated with the scheduled meeting. For example, the driver may be headed to school for a parent-teacher meeting or to the dentist for a cleaning, and the connected services system may identify a phone number of the teacher or the dentist with whom the driver is meeting. In another example, the driver may be heading to work for a scheduled meeting, and the scheduled meeting may be a conference call between the driver and one or more attendees. The connected services system may identify a phone number for at least one of the attendees of the scheduled meeting or identify a phone number for dialing into the conference call. In order to identify the phone number associated with the scheduled meeting, the connected services system may search and/or parse the driver's calendar or the driver's email inbox to identify information related to the scheduled meeting. For example, there may be an entry created in the driver's calendar when a meeting or appointment is added to the driver's calendar. The entry may include a description, a location, a start time, an end time, and contact information for one or more attendees of the meeting (e.g., a name, phone number, and/or email address for each attendee).

In some cases, the driver may be heading to work for a scheduled meeting, and the scheduled meeting may be a conference call between the driver and one or more attendees. The connected services system may identify a phone number for one of the attendees of the meeting. In some cases, the scheduled meeting may be a teleconference that is accessible by a dial-in phone number and a conference code. The connected services system may be able to identify the dial-in phone number and the conference code from a calendar entry or an email associated with the scheduled meeting in the driver's calendar. For example, the driver may use the connected services system to participate in the teleconference from his or her vehicle while he or she is driving to the meeting location. That is, the connected services system may initiate a call from the driver's mobile device by automatically dialing the dial-in phone number for the teleconference and dialing the conference code, e.g., when prompted. In other words, the driver may be able to join and participate in a conference call in an ergonomic and hands-free way using the connected services system. For example, the driver's mobile device may be docked in a phone holder or phone cradle on the dashboard of the driver's vehicle so that the mobile device may still be viewed by the driver while he or she is driving. Ultimately, the driver may be able to keep his or her hands on the steering wheel of the vehicle while participating in the conference call and maintaining safe driving behaviors through the connected services system.

In some cases, the connected services system may identify a first phone number for an attendee of the scheduled meeting and initiate a call from the driver's mobile device by dialing the first phone number. If the attendee does not answer the call, the connected services system may allow the driver to leave a voicemail and/or call a second attendee of the scheduled meeting. Thus, the connected services system may identify a second phone number for a second attendee of the scheduled meeting and initiate a second call from the driver's mobile device by dialing the second phone number. The connected services system may continue to identify and dial phone numbers of one or more attendees of the scheduled meeting until at least one of the attendees answers the call. Thus, the driver may be able to get into contact with at least one other attendee of the meeting so that he or she may be able to suggest rescheduling the meeting or inform the one or more attendees that he or she will be late to the meeting. Further, in some embodiments, rather than initiating a phone call, the connected services system may send a message (e.g., SMS, MMS, email) to one or more of the attendees. The message may include an indication of when the driver will arrive or a proposal to reschedule for another time (e.g., a time that the user will arrive or otherwise be available). Additionally, or alternatively, the message may include a reason that the driver is running late (e.g., traffic or weather). By integrating a driver's calendar, traffic information, maps, and other services with driving behavior and telematics information, the connected services system may enhance user experiences while driving and maintain vehicle safety on the roads.

In the following description of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is also noted that these connections are general and, unless specified otherwise, may be direct or indirect, wired or wireless, and that the specification is not intended to be limiting in this respect.

In one or more arrangements, teachings of the present disclosure may be implemented with a computing device. FIG. 1 illustrates a block diagram of an example connected services device 100 that may be used in accordance with aspects of the present disclosure. The connected services device 100 is a specialized computing device programmed and/or configured to perform and carry out aspects associated with providing connected service features to drivers as described herein. The connected services device 100 may have a connected services manager 101 configured to perform methods and execute instructions as described herein. The connected services manager 101 may be implemented with one or more specially configured processors and one or more storage units (e.g., databases, RAM, ROM, and other computer-readable media), one or more application specific integrated circuits (ASICs), and/or other hardware components. Throughout this disclosure, the connected services manager 101 may refer to the software (e.g., a computer program or application) and/or hardware used to receive driving behavior data for drivers, current vehicle locations, and corresponding times, identify a scheduled meeting, meeting location, and meeting time for each driver based on parsing data regarding each driver's calendar, estimate a time of arrival at which each driver's vehicle will arrive at the meeting location for the scheduled meeting, determine if the estimated arrival time is after the meeting time for each driver, and identify contact information (e.g., a phone number) associated with the scheduled meeting for each driver. Specifically, the connected services manager 101 may be a part of a connected services system that assesses driving behavior data, a current vehicle location, and a current time and performs a customized action for one or more of the various services or applications (e.g., calendar, tasks, reminders, map, traffic and navigation application, roadside assistance services, and the like) on the driver's mobile device. The one or more specially configured processors of the connected services manager 101 may operate in addition to or in conjunction with another general processor 103 of the connected services device 100. In some embodiments, the connected services manager 101 may be a software module executed by one or more general processors 103. Both the connected services manager 101 and the general processor 103 may be capable of controlling operations of the connected services device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, gesture or other sensors, and/or stylus through which a user or a driver associated with the connected services device 100 may provide input data. The I/O module 109 may also be configured to be connected to a display device 117, such as a monitor, television, touchscreen, and the like, and may include a graphics card. The display device 117 and input device 115 are shown as separate elements from the connected services device 100, however, they may be within the same structure.

Using the input device 115, system administrators may update various aspects of the connected services system, such as rules, predefined threshold values, predetermined ranges, and/or information related to parsing data regarding drivers' calendars in order to identify one or more scheduled meetings, meeting locations, and meeting times for drivers, estimating arrival times at various meeting locations for scheduled meetings, determining if estimated arrival times are within predefined periods of time from the meeting times, determining if estimated arrival times are after the meeting times, and identifying one or more phone numbers associated with each scheduled meeting. On some connected services devices 100, the input device 115 may be operated by users (e.g., drivers each associated with at least one vehicle) to interact with the connected services system, including receiving or submitting information regarding vehicle locations, traffic information, driving behaviors, calendar and/or task information, scheduled meetings, and/or estimated arrival times at scheduled meetings, requesting to reschedule scheduled meetings, contacting attendees of scheduled meetings, participating in conference calls, providing or updating preferences for connected services, updating account information, and the like, as described herein. In some embodiments, the input device 115 may include a microphone that allows drivers to verify or submit information by speech inputs and interact with the connected services system. Additionally or alternatively, the display device 117 may allow drivers to confirm or view their inputs.

The memory 113 may be any computer readable medium for storing computer executable instructions (e.g., software). The instructions stored within memory 113 may enable the connected services device 100 to perform various functions. For example, memory 113 may store software used by the connected services device 100, such as an operating system 119 and application programs 121, and may include an associated database 123.

The network interface 111 allows the connected services device 100 to connect to and communicate with a network 130. The network 130 may be any type of network, including a local area network (LAN) and/or a wide area network (WAN), such as the Internet. Through the network 130, the connected services device 100 may communicate with one or more computing devices 140, such as laptops, notebooks, smartphones, personal computers, servers, and the like. The computing devices 140 may include at least some of the same components as connected services device 100. In some embodiments the connected services device 100 may be connected to the computing devices 140 to form a "cloud" computing environment.

The network interface 111 may connect to the network 130 via communication lines, such as coaxial cable, fiber optic cable, and the like or wirelessly using a cellular backhaul or a wireless standard, such as IEEE 802.11, IEEE 802.15, IEEE 802.16, and the like. In some embodiments, the network interface may include a modem. Further, the network interface 111 may use various protocols, including TCP/IP, Ethernet, File Transfer Protocol (FTP), Hypertext Transfer Protocol (HTTP), and the like, to communicate with other computing devices 140.

FIG. 1 is an example embodiment of a connected services device 100. In other embodiments, the connected services device 100 may include fewer or more elements. For example, the connected services device 100 may use the general processor(s) 103 to perform functions of the connected services manager 101, and thus, might not include a separate processor or hardware for the connected services manager 101. Additionally, or alternatively, the connected services device 100 may be a mobile device (e.g., a smartphone, tablet, and the like) specially configured to perform or carry out aspects of connected services described herein, and thus, may also include various other components, such as a battery, speaker, and/or antennas (not shown). Also, the connected services device 100 may be a telematics device and/or a vehicle computing device (either installed by a vehicle manufacturer or as an aftermarket part) having vehicle compatible elements, such as a port for an on-board diagnostic connector or ports for other vehicle sensors (e.g., fuel level sensors, tire pressure sensors, engine temperature sensors, and the like). For example, the connected services device 100 may be a vehicle's computer or a device plugged into the vehicle's computer for use in vehicle telematics.

Figure 2:
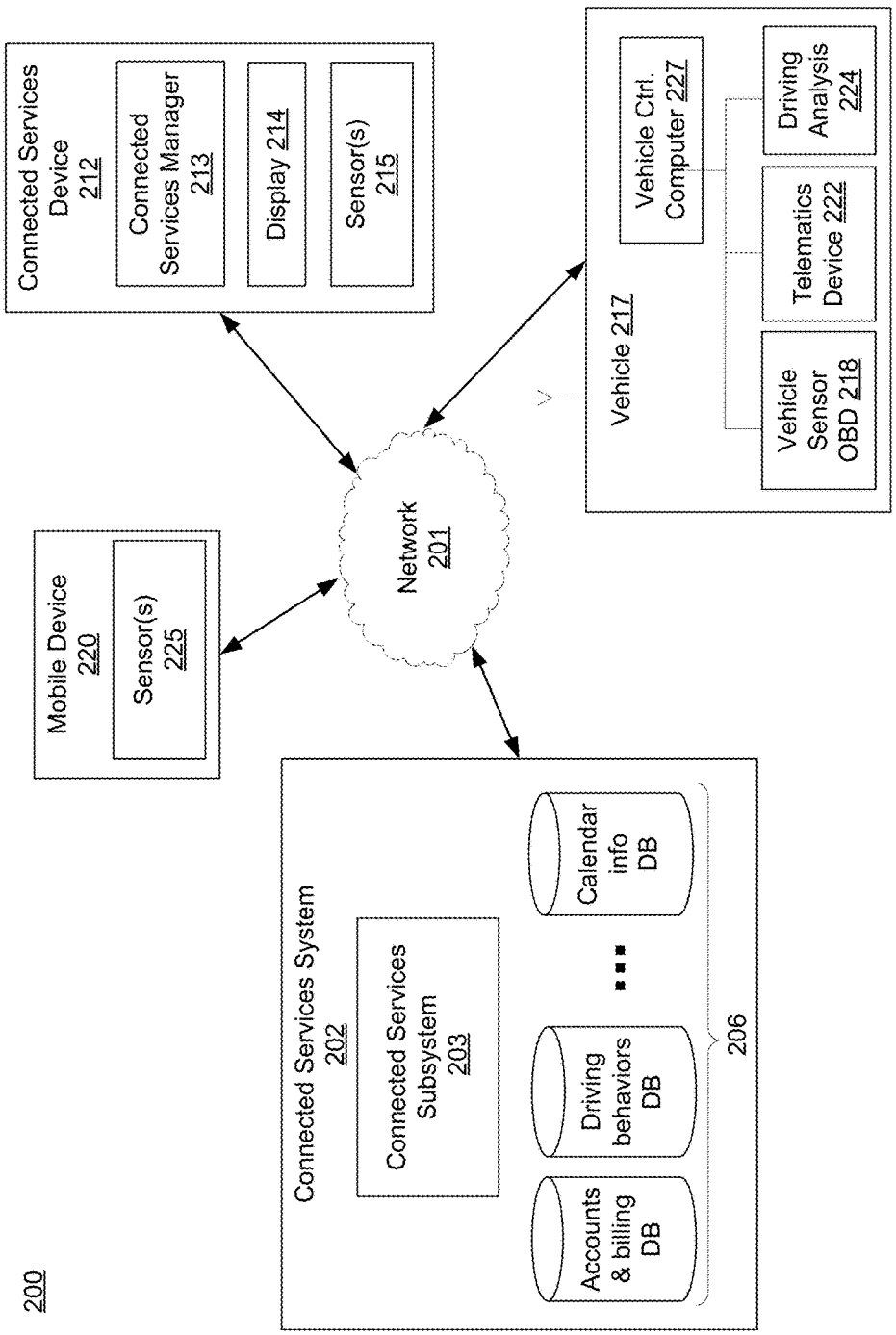
FIG. 2 depicts an example network environment in which various aspects of the present disclosure may be implemented in accordance with one or more example embodiments.

The computerized methods for providing connected service features in order to enhance each user's driving experience as disclosed herein may be implemented on one or more connected services devices 100 used in various network environments. FIG. 2 illustrates an example network environment 200 for implementing methods in accordance with aspects of the present disclosure.

As shown in FIG. 2, the network environment 200 may include a network 201 configured to connect a connected services system 202, connected services device 212, vehicle 217, and mobile device 220. The connected services device 212 may be the same as or at least similar to the connected services device 100 described above with reference to FIG. 1. Collectively, these specialized computing devices may form at least a part of a connected services system. Although only one of each of the components 212, 217, and 220 are shown in FIG. 2, it is understood that there may be any number of components 212, 217, and 220 in the network environment 200.

The network 201 may be any type of network, like the network 130 described above, and may use one or more communication protocols (e.g., protocols for the Internet (IP), Bluetooth, cellular communications, satellite communications, and the like.) to connect computing devices and servers within the network environment 200 so they may send and receive communications between each other. In particular, the network 201 may include a cellular network and its components, such as cell towers. Accordingly, for example, a mobile device 220 (e.g., a smartphone, flip-phone, tablet, and the like) or a connected services device 212 of a driver associated with vehicle 217 may communicate, via a cellular backhaul of the network 201, with a connected services system 202 to request to participate in connected services or features. For example, the mobile device 220 or connected services device 212 may request for the connected services system 202 to identify scheduled meetings and estimate arrival times of the vehicle 217 at each meeting location. In some cases, the request to identify scheduled meetings and arrival times of the vehicle 217 may be performed automatically by the mobile device 220 or the connected services device 212 upon receiving telematics data from the vehicle 217. For example, the mobile device 220 or connected services device 212 may identify that a driver is operating the vehicle 217 and driving to a certain destination (e.g., recognized based on receiving telematics data from the vehicle 217), and the mobile device 220 or connected services device 212 may automatically parse the driver's calendar to identify any upcoming scheduled meetings and approximate the driver's arrival time for each scheduled meeting. In another example, the mobile device 220 or the connected services device 212 of the driver of the vehicle 217 may communicate, via the cellular backhaul of the network 201, with the connected services system 202 to submit information regarding the driver's calendar, schedule, and/or tasks or to update account information and/or preferences for the connected services for the vehicle 217.

And in the opposite direction, the connected services system 202 may communicate, via the cellular backhaul of the network 201, with the mobile device 220 or the connected services device 212 to notify the user (e.g., the driver of vehicle 217) of the mobile device 220 or connected services device 212 of one or more scheduled meetings (including appointments and/or tasks) in the driver's calendar, meeting locations and meeting times for the scheduled meetings, estimated arrival times for each scheduled meeting, determinations of whether the driver will be late, early, or on time for each scheduled meeting, at least one phone number for each scheduled meeting, and the like. In some embodiments, scheduled meetings may include any meetings, appointments, teleconferences, errands, tasks, or reminders scheduled in a driver's calendar. For example, for each scheduled meeting, a driver may need to drive to various locations to perform different tasks and/or attend meetings; thus, the driver may schedule one or more times in his or her calendar as reminders on the mobile device 220 or the connected services device 212. In another embodiment, the mobile device 220 and/or connected services device 212 may communicate back and forth with the connected services system 202 over the Internet, such as through a web portal. As shown in FIG. 2, it should be understood that the mobile device 220 or connected services device 212 may connect to the network even if it is removed from the vehicle 217.

In an embodiment, there may be multiple vehicles 217 that are covered by an insurance policy of one individual, wherein the individual may be signed up for connected services for each of his or her vehicles 217. Although FIG. 2 illustrates only one vehicle 217, the connected services system may be configured to communicate with multiple vehicles 217 simultaneously (e.g., at or around the same time), and the multiple vehicles 217 may be associated with multiple individuals. The connected services system 202 may receive driving behavior data, current vehicle locations, and corresponding times for respective drivers of multiple vehicles simultaneously, determine scheduled meetings, meeting locations, and meeting times for respective drivers simultaneously, estimate arrival times for the multiple vehicles at the respective meeting locations simultaneously, determine that the estimated arrival times for the multiple vehicles are after the respective meeting times simultaneously, identify one or more phone numbers associated with each scheduled meeting for the respective drivers simultaneously, and notify the multiple drivers of the one or more phone numbers for each scheduled meeting simultaneously. The multiple vehicles 217 may be any type of vehicle, including a car, motorcycle, bicycle, scooter, drone (or other automated device), truck, bus, boat, plane, helicopter, and the like, wherein the multiple vehicles 217 may be the same or vary.

In an embodiment, there may be a driver associated with the vehicle 217. The driver may be associated with the vehicle 217 if the driver is an owner of the vehicle 217 and/or has access and/or permission to drive or operate the vehicle 217. Additionally or alternatively, a driver may be associated with the vehicle 217 if the driver is identified on an insurance policy that insures the vehicle 217. A driver of the vehicle 217 may interact with and operate a connected services device 212. In an embodiment, the connected services device 212 may be a specialized mobile device (e.g., mobile phone), a tablet, laptop, personal computer, and the like configured to perform or carry out aspects associated with connected services as described herein. For example, the connected services device 212 may be the same (e.g., integrated with, include substantially the same components and provide substantially the same functionality, or the like) as the mobile device 220 depicted in FIG. 2. The connected services device 212 may belong to a driver, individual, or customer of an insurance company who is enrolled in the connected services program. In some cases, the connected services device 212 may be at an insurance company, and data may be transmitted between the driver and the device 212. Although only one connected services device 212 is illustrated in FIG. 2, there may be any number of connected services devices 212, wherein each connected services device 212 is associated with at least one driver. The connected services device 212 may further comprise a connected services manager 213, a display 214, and sensors 215. In the case of a connected services device 212 that is installed in or connected to a vehicle 217 (e.g., an on-board vehicle computing device), the individual is considered to operate that connected services device 212 by performing the installation or connection of that device in or at the vehicle 217. In some embodiments, the connected services device 212 may be connected with a speaker system in the vehicle 217, so that the driver may be able to hear audio from the connected services device 212 through the speakers in the vehicle 217.

The connected services device 212 may be configured to execute the connected services manager 213 that presents a user interface (e.g., a graphical user interface for a website, application, software program, and the like) on the display 214. The display 214 may comprise a monitor, television, touchscreen, and the like. The user interface of the connected services manager 213 may allow drivers to send and receive information regarding, vehicle locations, traffic information, driving behaviors, calendar and/or task information, scheduled meetings, and/or estimated arrival times at scheduled meetings. Drivers may also employ the user interface of the connected services manager 213 to request to reschedule scheduled meetings, contact attendees of scheduled meetings, participate in conference calls (while driving in the vehicle 217), and update account information or preferences for connected services provided by the connected services system 202.

The connected services manager 213 may be a self-sufficient program or may be a module, plug-in, or add-on of another program, such as a program used to collect and/or evaluate driver information representing actions of a vehicle 217, driving behavior of a driver associated with a vehicle 217, and/or status updates of a vehicle 217. The connected services manager 213 may have access to driving behavior data that is collected by the sensors 215 of the connected services device 212. The connected services manager 213 may be configured in a similar manner as the connected services manager 101 or configured to perform similar functions as those performed by the connected services manager 101. The sensors 215 may comprise various sensors and/or modules that detect driving behaviors, vehicle location, environmental information, and/or other related factors of a driver of a vehicle 217. For example, the sensors 215 may comprise an accelerometer, speedometer, GPS, gyroscope, camera (or other image sensor), audio sensor, pressure sensor, and the like. The connected services manager 213 may also have access to vehicle information (e.g., a make, model, and/or year of a vehicle of a driver), driving behavior data, and/or other information that is collected by the sensors 215 of the connected services device 212. For example, the sensors 215 may include fuel level sensors, tire pressure sensors, car engine sensors, oxygen sensors, temperature sensors, water sensors, coolant sensors, position sensors, oil pressure gauges and the like. Each of these sensors 215 may be used to monitor various metrics of the vehicle 217 to ensure that the vehicle 217 is properly functioning under safe operating conditions.

In an embodiment, the connected services manager 213 may be downloaded or otherwise installed onto the connected services device 212 using known methods. Different devices may install different versions of the connected services manager 213 depending on their platform. A driver may launch the connected services manager 213 by, for example, operating buttons or a touchscreen on the connected services device 212 or by speech or a voice input. Additionally, or alternatively, the connected services device 212 may be configured to execute a web browser (e.g., an application for accessing and navigating the Internet) to access a web page providing an interface for the connected services system. In some embodiments, the connected services device 212 may also be configured to collect information, such as driving behavior data. For example, the connected services manager 213 or another program installed on the connected services device 212 may instruct the connected services device 212 to collect driving behavior data using the various sensors 215 and/or vehicle sensors 218 (e.g., accelerometer, speedometer, GPS, gyroscope, magnetometer, car engine sensors, oxygen sensors, temperature sensors, water sensors, coolant sensors, position sensors, oil pressure gauges, and the like). Driving behavior data may include data regarding a driver's speed, acceleration, braking, steering, turn signals, and the like. Drivers may exhibit different driving behaviors, such as staying within or going above posted speed limits or engaging in or avoiding sudden braking or sharp turning events while driving vehicle 217. Different driving behaviors may affect how quickly (and/or how slowly) a driver will reach a destination in his or her vehicle 217. This information may be used to predict when a vehicle will arrive at a meeting location (e.g., estimated time of arrival) for a scheduled meeting.

The connected services manager 213 or another program may also collect location information, such as GPS coordinates indicating the geographical location of the connected services device 212 and/or vehicle 217. In some embodiments, based on the collected driving behavior data and location information, the connected services manager 213 may recognize that the driver is driving to a certain destination based on the route that the driver is taking. For example, the connected services manager 213 may keep track of locations to which the driver has previously traveled in a period of time (e.g., in the past two days, week, 30 days, two months, or another period of time) and check the driver's calendar to confirm a meeting location and time for a scheduled meeting. For example, the connected services manager 213 may access a calendar of the driver, wherein the calendar may be a part of the connected services manager 213 or a feature from a different application on the connected services device 213. The connected services manager 213 may access the calendar and parse data to identify scheduled meetings, appointments, and/or tasks, along with corresponding locations and times. In some cases, the calendar may include descriptions and addresses for each scheduled meeting, appointment, and/or task for the driver.

Scheduled meetings may include any work meetings, lunch appointments, doctors' appointments, parent-teacher meetings, or any other appointments or tasks that a driver may schedule time for in his or her calendar. For example, a driver may schedule time for tasks or errands (e.g., which may be referred to as a scheduled meeting), such as picking up food for dinner on the way home, dropping off and/or picking kids, taking the driver's vehicle to the repair shop or car dealership for maintenance, and the like. The connected services manager 213 or another program installed on the connected services device 212 may collect driving behavior data over a predetermined period of time, parse data regarding the driver's calendar, and determine if there are any upcoming meetings, appointments, or tasks for the driver.

Based on the collected driving behavior data, the vehicle's current location, and the time corresponding to the vehicle's location, the connected services manager 213 may estimate a time of arrival at which the vehicle 217 will arrive at a location of a scheduled meeting. For example, the connected services manager 213 may calculate how long it will take for the driver in vehicle 217 to arrive at the meeting location based on the driver's current location, the driver's previous and current speeds, the distance between the current location and the meeting location, the amount of traffic in the driver's route, number of traffic signals on the driver's route, speed limits on the driver's routes, and the like. After estimating the driver's time of arrival the meeting location, the connected services manager 213 may determine if the estimated time of arrival is before or after the scheduled meeting time or if the estimated time of arrival is within a predefined period of time with respect to the meeting time.

In some embodiments, the connected services manager 213 may estimate a driver's time of arrival and determine whether or not the estimated time of arrival is within a predefined period of time from the meeting time for the scheduled meeting. The connected services manager 213 may determine if the driver will arrive within 2 minutes, 5 minutes, 10 minutes, 30 minutes, 1 hour, or another predefined period of time with respect to the meeting time for the scheduled meeting. For example, the driver may arrive at a meeting location prior to the scheduled meeting time, but he or she may need additional time to find parking, park his or her vehicle, walk to the building, get to and find the meeting room (e.g., conference room), and/or prepare for the meeting. In such cases, the connected services manager 213 may take into account these factors and determine whether the driver will have the additional time needed to be at the meeting in time. For example, the connected services manager 213 may evaluate past tracking data to determine an average amount of time a user takes to walk from her vehicle to her office and add that amount of time to the driving time to determine whether the user will be late or on time for a meeting.

The connected services manager 213 may determine that the estimated time of arrival is after the scheduled meeting time or not within a predefined period of time with respect to the scheduled meeting time. In other words, the connected services manager 213 may determine that the driver will be late to the meeting and subsequently identify a phone number associated with the scheduled meeting. For example, the connected services manager 213 may identify a personal phone number or office phone number associated with an individual, client, or business with whom the driver is meeting. In another example, the connected services manager 213 may identify a dial-in number for a conference call at work for the driver. In yet another example, the connected services manager 213 may identify multiple phone numbers, wherein each phone number may correspond to an attendee of a scheduled meeting with the driver.

The connected services manager 213 may identify at least one phone number and then provide the driver with one or more options on how to proceed. In some cases, the driver may wish to reschedule the meeting, send a notification to each attendee of the meeting to notify that the driver will be late, call at least one attendee of the meeting, and/or join a conference call from the vehicle 217. For example, the driver may be stuck in traffic and may be an hour or so away from the meeting location. In such cases, the driver may want to reschedule the meeting for another day or time and may want to contact an attendee of the meeting or an organizer of the meeting to reschedule.

In some embodiments, the connected services manager 213 may access and evaluate the driver's calendar to determine a soonest time at which the driver is available after the driver's estimated time of arrival. The connected services manager 213 may then send a notification to a person that the driver was supposed to speak with at the scheduled meeting, in which the notification includes a proposal to reschedule the scheduled meeting for the soonest time. For example, the scheduled meeting may be at 9 AM on a Thursday, and based on the driver's estimated time of arrival, the driver will be more than an hour late. The connected services manager 213 may determine that the driver will be free in the afternoon (e.g., 1 pm) of the same day (e.g., Thursday) or determine that the driver will not be available until Monday morning (e.g., 9 AM) of next week. Thus, the connected services manager 213 may send a notification to the person with whom the driver was supposed to meet, in which the notification may include a proposal to reschedule the meeting for Thursday afternoon or Monday morning.

In another example, the driver may merely be a few minutes late and may still be able to get to the meeting location in time for most of the meeting. In this case, the driver may wish to notify the attendees of the meeting that the driver is on his or her way and share his estimated time of arrival. In yet another example, the driver's scheduled meeting may be a conference call with other attendees, and the driver may wish to join the conference call from his or her vehicle while driving to the meeting location. Ultimately, the driver may set his or her preferences for notifications (e.g., by a phone call, text message, and/or email sent to one or more attendees) and/or initiating calls for different scheduled meetings through the connected services manager 213 on the connected services device 212. The driver may also set preferences related to when a positive determination is made that the driver will be late. For example, the driver may set a threshold of 5 minutes so that no action is taken if the driver is just going to be 5 minutes late.

Based on the driver's preferences, the connected services manager 213 may automatically perform one of the options described herein or send requests for each option to the driver to confirm how he or she would like to proceed. The driver associated with the vehicle 217 and associated with the connected services device 212 may employ the connected services manager 213 to send, receive, confirm, and/or access at least one of calendar information, scheduled meeting information (e.g., including meeting locations and meeting times), estimated arrival times, driving behavior information, account information, and settings/preferences related to the vehicle 217.

As illustrated in FIG. 2, vehicle 217 also includes vehicle operation sensor 218 (similar to one or more sensors 215) capable of detecting and recording various conditions at the vehicle and operational parameters of the vehicle. For example, sensor 218 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensor 218 also may detect and store data received from the vehicle's 217 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board diagnostic systems (OBD).

Additional sensors 218 may detect and store the external driving conditions, for example, external temperature, rain, snow, light levels, and sun position for driver visibility. For example, external cameras and proximity sensors 218 may detect other nearby vehicles, vehicle spacing, traffic levels, road conditions, traffic obstructions, animals, cyclists, pedestrians, and other conditions that may factor into a driving data/behavior analysis. Sensor 218 also may detect and store data relating to moving violations and the observance of traffic signals and signs by the vehicle 217. Additional sensors 218 may detect and store data relating to the maintenance of the vehicle 217, such as the engine status, oil level, engine coolant temperature, odometer reading, the level of fuel in the fuel tank, engine revolutions per minute (RPMs), software upgrades, and/or tire pressure.

Vehicle sensor 218 also may include cameras and/or proximity sensors capable of recording additional conditions inside or outside of the vehicle 217. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensor 218 also may be configured to collect data identifying a current driver from among a number of different possible drivers, for example, based on driver's seat and mirror positioning, driving times and routes, radio usage, etc. Voice/sound data along with directional data also may be used to determine a seating position within a vehicle 217. Sensor 218 also may be configured to collect data relating to a driver's movements or the condition of a driver. For example, vehicle 217 may include sensors that monitor a driver's movements, such as the driver's eye position and/or head position, etc. Additional sensors 218 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer, along with other biometric sensors.

Certain vehicle sensors 218 also may collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, sensors and/or cameras 218 may determine when and how often the vehicle 217 stays in a single lane or strays into other lane. A Global Positioning System (GPS), locational sensors positioned inside the vehicle 217, and/or locational sensors or devices external to the vehicle 217 may be used to determine the route, speed, lane position, road-type (e.g. highway, entrance/exit ramp, residential area, etc.) and other vehicle position/location data.

The data collected by vehicle sensor 218 (e.g., driving behavior data) may be stored and/or analyzed within the vehicle 217, such as for example by a driving analysis computer 224 integrated into the vehicle, and/or may be transmitted to one or more external devices. For example, as shown in FIG. 2, sensor data may be transmitted via a telematics device 222 to one or more remote computing devices, such as connected services device 212, mobile device 220, connected services system 202, and/or other remote devices.

As shown in FIG. 2, the data collected by vehicle sensor 218 may be transmitted to a connected services system 202, connected services device 212, mobile device 220, and/or additional external servers and devices via telematics device 222. Telematics device 222 may be one or more computing devices containing many or all of the hardware/software components as the connected services manager 101 depicted in FIG. 1. The telematics device 222 may receive vehicle operation data and driving data from vehicle sensor 218, and may transmit the data to one or more external computer systems (e.g., connected services system 202, insurance system server of an insurance company, financial institution, or other entity) over a wireless transmission network. Telematics device 222 also may be configured to detect or determine additional types of data relating to real-time driving and the condition of the vehicle 217. The telematics device 217 also may store the type of vehicle 217, for example, the make, model, trim (or sub-model), year, and/or engine specifications, as well as other information such as vehicle owner or driver information, insurance information, and financing information for the vehicle 217.

In some cases, the telematics device 222 may be a device that is plugged into the vehicle's 217 on-board diagnostic (OBD) system (e.g., plugged in through an OBD II connector) or otherwise installed in the vehicle 217 in order to collect data. The telematics device 222 may also collect GPS coordinates, such as through its own GPS receiver. In the example shown in FIG. 2, the telematics device 222 may receive vehicle driving behavior data from vehicle sensor 218, and may transmit the data to a connected services system 202. As mentioned above, this driving behavior data may include data indicative of one or more vehicle metrics or vehicle telematics data, such as based on a driver's speed, acceleration, braking, steering, turn signals, and the like. In other examples, one or more of the vehicle sensors 218 or systems may be configured to receive and transmit data directly from or to a connected services system 202 without using a telematics device. For instance, telematics device 222 may be configured to receive and transmit data from certain vehicle sensors 218 or systems, while other sensors or systems may be configured to directly receive and/or transmit data to a connected services system 202 without using the telematics device 222. Thus, telematics device 222 may be optional in certain embodiments.

In some embodiments, telematics device 222 may be configured to execute a connected services manager that presents a user interface for a driver and/or user to provide inputs to and receive outputs from the connected services system 202. The connected services manager 213 may be downloaded or otherwise installed onto the telematics device 222 using known methods. Once installed onto the telematics device 222, a driver may launch the connected services manager 213 by, for example, operating buttons or a touchscreen on the dashboard of the vehicle 217 or by speech or a voice input. Additionally, or alternatively, the telematics device 222 may be configured to execute a web browser to access a web page providing an interface for the connected services system 202.

FIG. 2 also illustrates a mobile device 220 which may be any mobile device associated with a driver or passenger of vehicle 217. In particular, the mobile device 220 may belong to a driver of the vehicle 217, wherein the driver is a customer of an insurance company and enrolled in a program that allows the driver to participate in connected services. Mobile device 220 may be, for example, a smartphone or other mobile phone, personal digital assistant (PDA), tablet computer, and the like, and may include some or all of the elements described above with respect to the connected services manager 101. As shown in this example, some mobile devices (e.g., mobile device 220) may be configured to establish communication sessions with vehicle-based devices and various internal components of vehicle 217 via wireless networks or wired connections (e.g., for docked devices), whereby such mobile devices 220 may have secure access to internal vehicle sensors 218 and other vehicle-based systems. For example, the mobile device 220 may be docked in the driver's vehicle 217 in order to provide a hands-free experience for the driver. That is, the mobile device 220 may be docked in a phone holder or phone cradle configured in the driver's vehicle 217, such as on the dashboard, so that the driver may be able to view his or her mobile device 220 and maintain safety while driving and engaging in connected services.

In other examples, the mobile device 220 might not connect to vehicle-based computing devices and internal components, but may operate independently by communicating with vehicle 217 via their standard communication interfaces (e.g., telematics device 222, etc.), or might not connect at all to vehicle 217. In some cases, the mobile device 220 may be configured similarly to the connected services device 212 and may interface or communicate with the telematics device 222 via a wired connection (e.g., USB, OBD II connector, and the like) or a wireless connection (e.g., Bluetooth). In some embodiments, both telematics device 222 and mobile device 220 (or a connected services device 212) may be employed, whereas in another embodiment, only one of these devices may be used with the connected services system to collect driving behavior data and vehicle locations. For example, a driver associated with the vehicle 217 may choose whether he or she wishes to use his or her mobile phone to capture driving behavior data or whether he or she wishes to have a device plugged into the vehicle 217 to collect driving behavior data.

FIG. 2 also illustrates example subsystems within the network environment 200. That is, the connected services system 202 may comprise a connected services subsystem 203 and a plurality of databases 206. The connected services subsystem 203 may include one or more application servers, computing devices, and other equipment (e.g., conference bridge equipment) used by company (e.g., insurance company) personnel to implement and provide the connected services described herein. For example, the connected services subsystem 203 may include a module or component that is configured with programmed instructions to identify a scheduled meeting, meeting location, and meeting time for a driver of vehicle 217 based on parsing the driver's calendar, estimate a time of arrival at which the vehicle 217 will arrive at the meeting location for the scheduled meeting based on driving behavior data, a current location of the vehicle 217, and a time corresponding to the current location of the vehicle 217, determine whether or not the estimated time of arrival at the meeting location is after the meeting time or within a predefined period of time from the meeting time, and identify a phone number associated with the scheduled meeting.

In some embodiments, the module or component may access calendar information which may be stored in one or more databases 206 in order to identify one or more scheduled meetings for the driver. For example, the module may identify scheduled meeting locations and meeting times by parsing calendar information stored in a database 206. The calendar information may include a schedule of one or more appointments, meetings, tasks, reminders, and the like, including descriptions, addresses (e.g., meeting locations), and meeting times for each scheduled meeting in the driver's calendar. The module may determine that there is an upcoming meeting scheduled in the driver's calendar and calculate the driver's estimated arrival time at a meeting location based on the driver's driving behavior data, the driver's current location of the vehicle 217, and the time corresponding the current location of the vehicle 217. The module may then determine that the driver will be late to the scheduled meeting. That is, the module may determine that the driver's estimated arrival time is after the scheduled meeting time or not within a predefined period of time with respect to the meeting time. In such cases, the module may identify a phone number associated with the scheduled meeting, such as a phone number for an attendee of the meeting, or a phone number for dialing in to a conference call. In other embodiments, the module may determine that the driver's estimated arrival time is before the scheduled meeting time and that the driver of vehicle 217 will arrive on time for his or her meeting. Thus, the module may send a notification to the mobile device 220 or connected services device 212 to inform the driver of the estimated arrival time and to notify the driver that he or she will be on time for the scheduled meeting.

The module or component may store and/or access data regarding a driver's calendar information and driving behavior data as one or more records in a database (e.g., database 206) of the connected services system, in which the one or more records may be associated with driver or customer records stored in the database. For example, the one or more records may identify a unique identification number or account number for a driver or customer. In another example, the one or more records may include a field for the scheduled meeting description (e.g., describing what the meeting is regarding, which individuals will be attending, etc.), a field for the meeting location, a field for the meeting time, a field for at least one phone number associated with the scheduled meeting, a field for the driver's estimated time of arrival, and the like. The module may update the meeting description, meeting location, meeting time, associated phone number(s), and the like, by inserting one or more identifiers in the fields of the one or more records.

In some embodiments, the module of the connected services subsystem 203 may identify multiple scheduled meetings in the driver's calendar. For example, the driver may have a first meeting at 8 AM on Monday, a second meeting at 9 AM on Monday, and so forth. The connected services system may be able to estimate arrival times at each scheduled meeting based on the driver's driving behavior data, the current vehicle location, and corresponding (current) time. In some cases, the driver may have two meetings scheduled at the same time or within a half hour (or another period of time) of each other in his or her calendar. For example, the driver may have a work meeting and a doctor's appointment both scheduled at 10:30 AM on Tuesday in his or her calendar. The work meeting may be located in a first city, whereas the doctor's office may be across town in a second city. The driver may decide to skip the work meeting and go to the doctor's appointment for health issues, or the driver may skip the doctor's appointment and go to the work meeting to meet a certain deadline. The module of the connected services subsystem 203 may be able to determine which scheduled meeting that the driver is attending based on the route that the driver is driving in the vehicle 217.

Additionally or alternatively, the connected services module may also be able to prioritize scheduled meetings for a driver. For example, the module may parse data regarding a driver's calendar and/or a driver's email inbox to identify one or more project deadlines for work, and the module may determine that a work meeting has a higher priority than another scheduled meeting at the same time. In some cases, the module may be able to prioritize scheduled meetings based on the driver's preferences. That is, the driver may set preferences for the module to prioritize certain meetings, appointments, and/or tasks over others in his or her calendar. For example, the driver may wish to prioritize scheduled meetings, such as picking up his or her kids from school or doctor's appointments over work meetings. The driver may indicate these preferences using the connected services manager 213 on the connected services device 212. By prioritizing scheduled meetings for drivers based on calendars, email inbox, and/or driver preferences, the connected services system may provide drivers with additional functionality to enhance the user experience.

The connected services subsystem 203 may include functionality that may be distributed among a plurality of computing devices. For example, the connected services subsystem 203 may comprise further subsystems, including client-side subsystems and server-side subsystems. The client-side subsystem may interface with the connected services device 212, telematics device 222, and/or mobile device 220, whereas the server-side subsystem may interface with application servers and computing devices which handle a variety of tasks related to estimating arrival times for scheduled meetings and determining responses based on driving behavior and telematics data, as well as the overall management of connected services.

The subsystems, application servers, and computing devices of the connected services subsystem 203 may also have access to the plurality of databases 206. In an embodiment, the plurality of databases 206 may be incorporated into the connected services subsystem 203 or may be separate components in the connected services subsystem 203. As an example, the plurality of databases 206 may comprise an accounts and billing database, a driving behaviors database, a calendar information database, and other databases. A database 206 may comprise information regarding at least one of driving behavior data, vehicle information, calendar information including scheduled meeting times and locations, estimated arrival times, connected services information, driver preferences, and account and billing information. For example, a database 206 may store a record of driving history, such as previous locations at which the driver has had meetings, previous driving behaviors, driving patterns, predefined periods of time that a driver may need with respect to a meeting time (such as the time needed in order to arrive at a meeting location and have enough time to find a meeting room and be prepared for the meeting), and the like. The data stored in the plurality of databases 206 may be collected and compiled by the connected services device 212, the telematics device 222, the connected services subsystem 203, or by servers and subsystems within the connected services subsystem 203.

Figure 3:
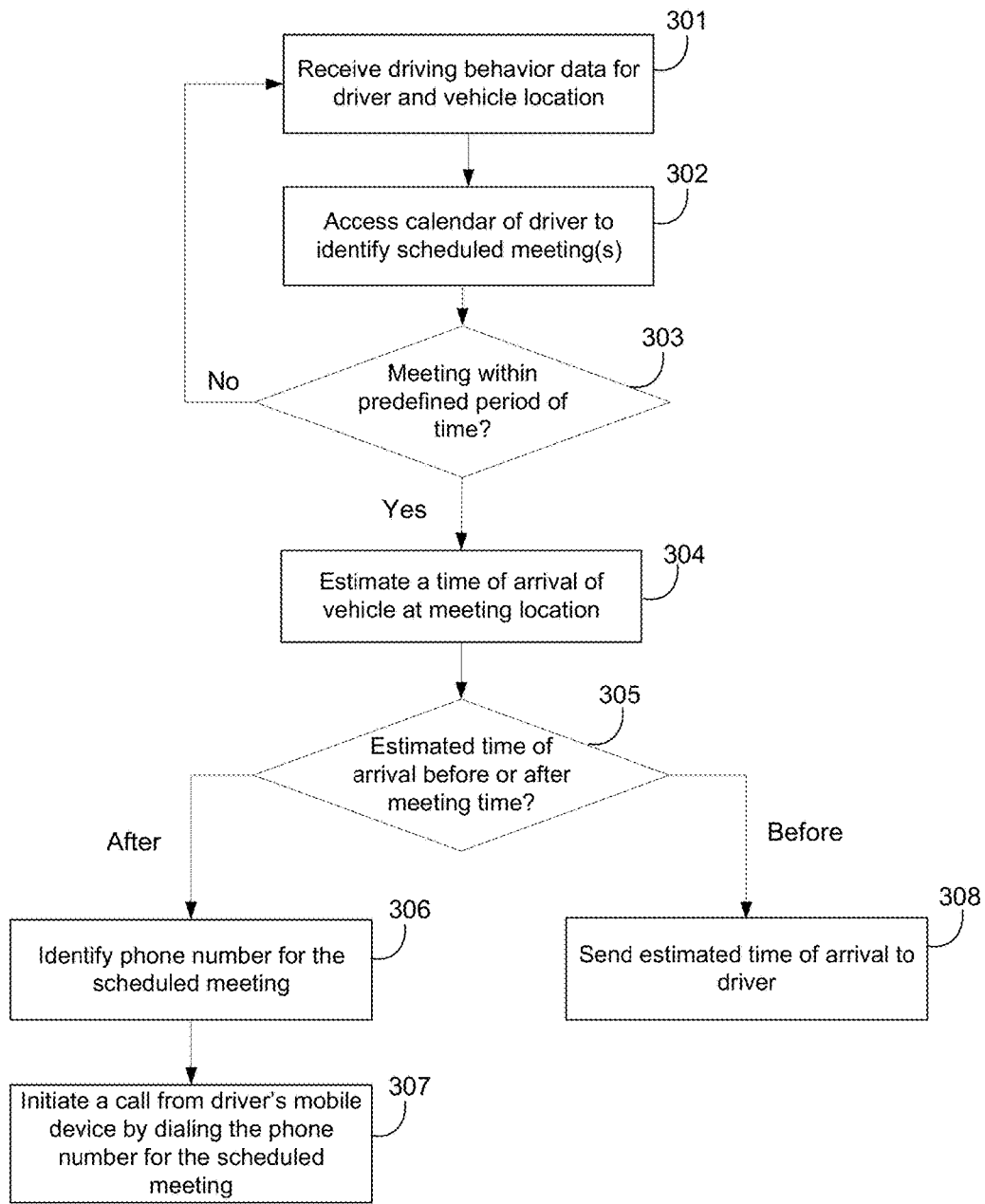
FIG. 3 depicts a flow diagram of example method steps for estimating arrival times for drivers at scheduled meetings in accordance with one or more example embodiments.

FIG. 3 illustrates a flow diagram of an example method in accordance with aspects of the present disclosure. In particular, FIG. 3 illustrates example method steps for identifying one or more scheduled meetings, meeting locations, and meeting times for drivers, estimating arrival times at various meeting locations for scheduled meetings, determining if estimated arrival times are after the meeting times, and identifying one or more phone numbers associated with each scheduled meeting. The steps of FIG. 3 may be performed by subsystems, application servers, and computing devices of the connected services system 202 (e.g., connected services subsystem 203). One or more of the steps of FIG. 3 may be performed by executing a connected services program (e.g., a connected services mobile application) and/or by operating a particularly configured computing device of the connected services system 202. As a result of the method of FIG. 3, a driver, at connected services device 212 (e.g., and/or at mobile device 220) and associated with vehicle 217, may be provided with an estimated arrival time for the scheduled meeting or the driver may be connected in a phone call with others associated with the scheduled meeting. In the latter case, the connected services system 202 may initiate the phone call (e.g., by dialing a particular phone number associated with the scheduled meeting, such as a phone number of an expected attendee of the meeting) or cause a mobile device (e.g., smartphone) of the driver to initiate a call.

The method of FIG. 3 may begin with a step 301 of receiving driving behavior data for a driver and a vehicle location. For example, the connected services system 202 may receive driving behavior data for a driver of the vehicle 217, along with the current location of the vehicle 217, and the time corresponding to the current location of the vehicle 217. In some embodiments, the driving behavior data of the vehicle 217 may be collected over a period of time by the telematics device 222, connected services device 212, or mobile device 220. Driving behavior data may include a rate of acceleration, deceleration, braking, number of turns, miles driven, and the like in the vehicle 217. The current location of the vehicle 217 may include GPS data indicating the present location of the vehicle 217, along with a time and date of when the GPS data was obtained (e.g., the time at which the vehicle 217 was at the specific location). At step 302, the connected services system may access a calendar of the driver to identify one or more scheduled meetings. For example, the connected services system 202 may parse data regarding a calendar of the driver in order to identify at least one scheduled meeting in the driver's calendar, along with a meeting location and meeting time.

At step 303, the connected services system may determine if a scheduled meeting is within a predefined period of time. For example, the connected services system 202 may determine if the scheduled meeting is within half an hour, an hour, two hours, a day, or another period of time. If the scheduled meeting is not within the predefined period of time, then the method in this example proceeds to step 301. For example, if the scheduled meeting is not within the same day, within a few hours, or within the predefined period of time, then the connected services system 202 might not estimate an arrival time for the driver until a later time. The connected services system 202 may continue to collect driving behavior data and vehicle location information at step 301 until the system 202 detects a scheduled meeting within a predefined period of time with respect to the current time.

If the scheduled meeting is within the predefined period of time, then the method in this example proceeds to step 304. At step 304, the connected services system may estimate an arrival time for the driver at the meeting location. For example, the connected services system 202 may estimate a time of arrival at which the vehicle 217 will arrive at the meeting location for the scheduled meeting based on the driving behavior data, current location of vehicle 217, and the time corresponding to the current location of vehicle 217. At step 305, the connected services system may determine if the estimated time of arrival is before or after the meeting time. For example, the connected services system 202 may determine if the vehicle 217 will arrive at the meeting location before or after the meeting time. In some embodiments, the connected services system 202 may determine if the estimated time of arrival is within a predefined period of time with respect to the meeting time. For example, the driver may need additional time (e.g., 2 minutes, 5 minutes, 10 minutes, 30 minutes, 1 hour, or another predefined period of time) with respect to the meeting time in order to be prepared for the scheduled meeting. Thus, the connected services system 202 may account for this additional time in step 305.

If the estimated time of arrival is after the meeting time for the scheduled meeting or not within a predefined period of time with respect to the meeting time, then the method in this example proceeds to step 306. At step 306, the connected services system may identify a phone number associated with the scheduled meeting. For example, the connected services system 202 may identify a personal phone number or an office phone number associated with an individual, client, or business with whom the driver is meeting. In another example, the connected services system 202 may identify a dial-in number for a conference call for the driver's scheduled meeting. In yet another example, the connected services manager 213 may identify multiple phone numbers, wherein each phone number may correspond to an attendee of a scheduled meeting with the driver.

At step 307, the connected services system may initiate a call by dialing the phone number for the scheduled meeting. For example, the connected services system 202 may initiate a call from the mobile device 220 or the connected services device 212 of the driver by automatically dialing the phone number associated with the scheduled meeting. In some cases, the phone number may be a dial-in number for a conference call between the driver the vehicle 217 and one or more attendees of the scheduled meeting. The connected services system 202 may also dial a conference code number after entering the dial-in number for the conference call. Thus, the connected services system 202 may be able to connect the driver to the one or more attendees of the scheduled meeting through the conference call, and the driver may be able to participate in the conference call while driving in his or her vehicle 217.

If the estimated time of arrival is before the meeting time for the scheduled meeting or within a predefined period of time with respect to the meeting time, then the method in this example proceeds to step 308. At step 308, the connected services system may send an estimated arrival time to the driver. For example, the connected services system 202 may send a notification (e.g., a phone call, a text message, an email, an alert or push notification, etc.) to the mobile device 220 or the connected services device 212 to notify the driver that he or she will arrive in time for the scheduled meeting.

Figure 4:
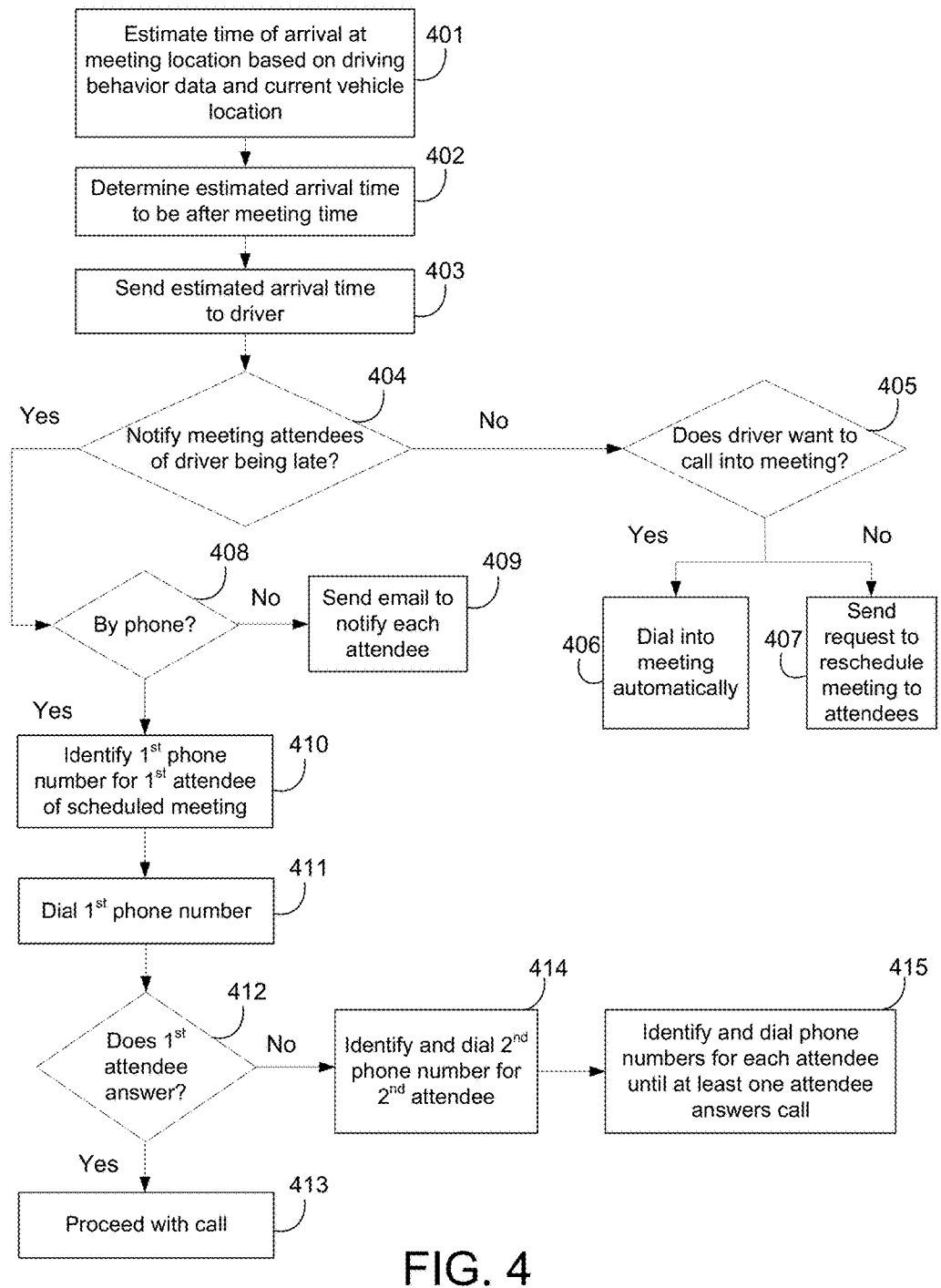
FIG. 4 depicts a flow diagram of example method steps for estimating arrival times for drivers and providing options to notify attendees of scheduled meetings in accordance with one or more example embodiments.

FIG. 4 illustrates a flow diagram of an example method in accordance with aspects of the present disclosure. In particular, FIG. 4 illustrates example method steps for estimating arrival times at various meeting locations and providing options to drivers for notifying attendees of scheduled meetings in accordance with one or more example embodiments. The steps of FIG. 4 may be performed by subsystems, application servers, and computing devices of the connected services system 202 (e.g., connected services subsystem 203). One or more of the steps of FIG. 4 may be performed by executing a connected services program (e.g., a connected services mobile application) and/or by operating a particularly configured computing device of the connected services system 202. As a result of the method of FIG. 4, a driver, at connected services device 212 (e.g., and/or at mobile device 220) and associated with vehicle 217, may be able to notify one or more attendees of a scheduled meeting of the driver being late, automatically dial into a scheduled meeting (e.g., for a conference call), or send a request to one or more attendees reschedule a meeting.

The method of FIG. 4 may begin with a step 401 of estimating an arrival time at a meeting location for a scheduled meeting. For example, the connected services system 202 may estimate a time of arrival at which the vehicle 217 will arrive at the meeting location for the scheduled meeting based on the driving behavior data, current location of vehicle 217, and the time corresponding to the current location of vehicle 217. At step 402, the connected services system 202 may determine the estimated arrival time to be after the meeting time, and at step 403, the connected services system 202 may send the estimated arrival time to the driver. That is, the connected services system 202 may send the estimated arrival time in a notification (e.g., a phone call, a text message, an email, an alert or push notification, etc.) to the mobile device 220 or the connected services device 212 to notify the driver.

At step 404, the connected services system may determine if the driver wishes to notify meeting attendees of being late to the scheduled meeting. For example, the connected services system 202 may check account information or preferences set by the driver on the connected services device 212 or the mobile device 220 to determine if the driver has requested to notify one or more attendees of scheduled meetings of his or her estimated time of arrival. In another example, the connected services system 202 may send a request to the connected services device 212 or the mobile device 220 of the driver to confirm the driver's preferences.

If the driver does not choose to notify the attendees of his or her estimated arrival time (e.g., not to notify the attendees of the driver being late to the meeting), then the method in this example proceeds to step 405. At step 405, the connected services system may determine if the driver wants to call into a scheduled meeting. For example, the scheduled meeting may comprise a conference call between the driver of the vehicle 217 and one or more attendees. In some cases, the driver may be running late and may wish to participate in the conference call from his or her vehicle 217. Thus, if the driver chooses to call into the meeting, at step 406, the connected services system 202 may initiate a call from the mobile device 220 or the connected services device 212 of the driver by automatically dialing a phone number associated with the scheduled meeting (e.g., dial-in number for the conference call). If the driver chooses not to call into the meeting, at step 407, the connected services system 202 may send a notification or a request to reschedule the meeting to one or more attendees of the meeting. In some embodiments, each attendee of the meeting may operate a mobile device and may receive the notification on his or her respective mobile device.

With respect to step 404, if the driver chooses to notify the attendees of his or her estimated arrival time (e.g., notify the attendees of the driver being late to the meeting), then the method in this example proceeds to step 408. At step 408, the connected services system 202 may determine whether or not the driver wishes to notify the one or more attendees of the driver being late by a phone call. If the driver chooses not to notify the one or more attendees of the driver being late by a phone call, then the method in this example proceeds to step 409. At step 409, the connected services system 202 may send an email message to notify each attendee of the driver being late to the meeting. In some embodiments, the email message may indicate a request from the driver to reschedule the meeting to a later time and/or date.

If the driver chooses to notify the one or more attendees of the driver being late by a phone call, then the method in this example proceeds to step 410. At step 410, the connected services system 202 may identify a first phone number for a first attendee of the scheduled meeting, and at step 411, the connected services system 202 may initiate a call from the mobile device 220 or the connected services device 212 of the driver by automatically dialing the first phone number for the first attendee of the scheduled meeting. At step 412, the connected services system 202 may determine if the first attendee has answered the phone call. If the first attendee has answered the phone call, then the method in this example proceeds to step 413. At step 413, the connected services system 202 may proceed with the phone call, in which the driver may communicate with the first attendee regarding the driver being late to the scheduled meeting. In some cases, the driver may be able to leave a voicemail with the first attendee's phone number.

If the first attendee has not answered the phone call, then the method in this example proceeds to step 414. At step 414, the connected services system 202 may identify a second phone number for a second attendee of the scheduled meeting and automatically dial the second phone number from the mobile device 220 or the connected services device 212 of the driver. At step 415, the connected services system 202 may continue to identify and dial phone numbers for each attendee of the scheduled meeting until at least one attendee answers the phone call from the mobile device 220 or the connected services device 212 of the driver. Ultimately, the driver may be able to get into contact with at least one other attendee of the meeting so that he or she may be able to suggest rescheduling the meeting or inform the one or more attendees that he or she will be late to the meeting.

Figure 5B:
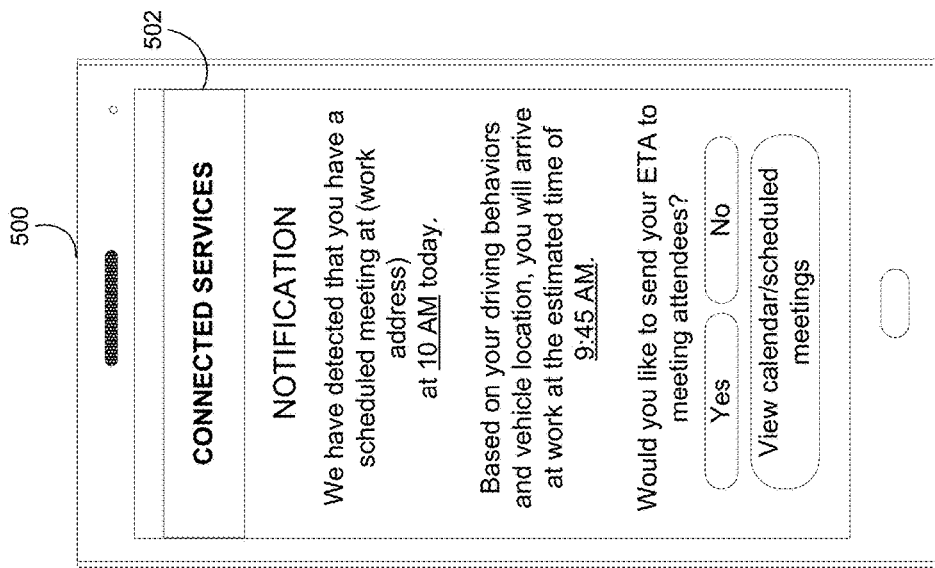
FIGS. 5A and 5B depict example user interfaces of a connected services configurator application in accordance with one or more example embodiments.
Figure 5A:
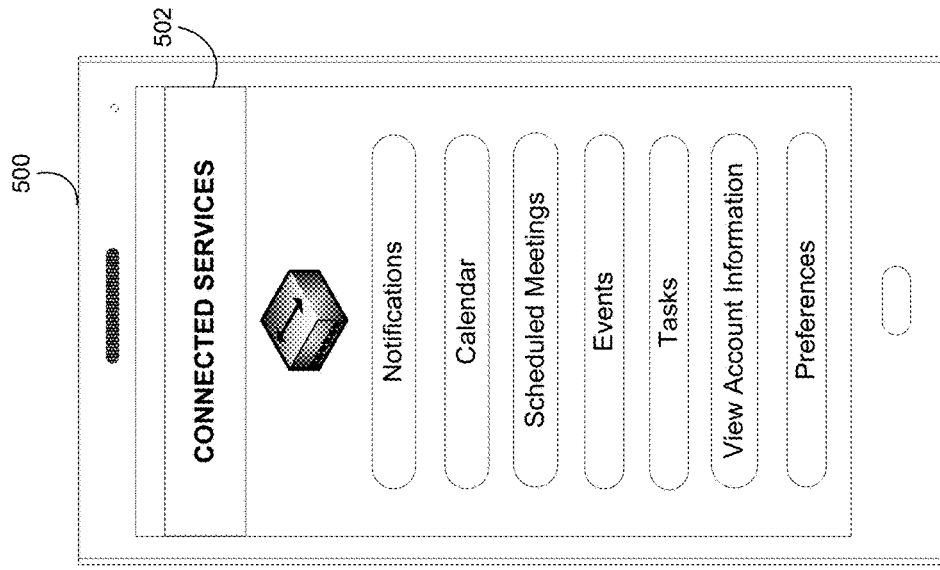

FIGS. 5A-5B each depict an illustrative diagram of example user interfaces of a connected services application 502 operating on a connected services device 500 in accordance with aspects of the present disclosure. The example user interfaces may be presented on a display of a computing device, such as display 214 of connected services device 212, on a mobile device such as mobile device 220 in FIG. 2, on a vehicle display of an on-board vehicle computing device, or the like. A driver operating a vehicle, such as vehicle 217, may access a connected services application 502 using a connected services device 500 (e.g., at least one of the connected services device 212, telematics device 222, or mobile device 220). Specifically, FIGS. 5A and 5B illustrate example user interfaces of utilizing a connected services application 502 to view and manage connected services. The user interface in FIG. 5A depicts a menu for the connected services application 502 that may be displayed on the connected services device 500. The driver operating the connected services device 500 may tap on a button or icon on the user interface to navigate to different screens in the connected services application 502. For example, the driver may select one or more of the following options: "Notifications", "Calendar", "Scheduled Meetings", "Events", "Tasks", "View Account Information", and "Preferences." In some cases, the driver may navigate to different screens in the connected services application 502 or select different options in the connected services application 502 by speech or voice inputs.

The user interface in FIG. 5B depicts what may be displayed on the connected services device 500 after the driver receives a notification regarding connected services. For example, the user interface of FIG. 5B may be displayed when the driver selects the "Notifications" option shown in the user interface of FIG. 5A. In this screen, the driver may select one or more options in response to a notification regarding connected services. The "Notification" may inform the driver that the connected services application 502 has identified an upcoming scheduled meeting in the driver's calendar. For example, the connected services application 502 may identify a meeting location and meeting time for the scheduled meeting and inform the driver of an estimated arrival time at the meeting location based on the driver's driving behavior data, vehicle location, and the time corresponding to the driver's vehicle location. In some cases, the connected services application 502 may request confirmation from the driver before sending the estimated time of arrival to one or more meeting attendees. The driver may respond to the notification by accepting or declining to send his or her estimated time of arrival to the one or more meeting attendees. The driver may also select the "View calendar/scheduled meetings" option to view upcoming or previous meetings in his or her calendar.

Figures 6A, 6B:
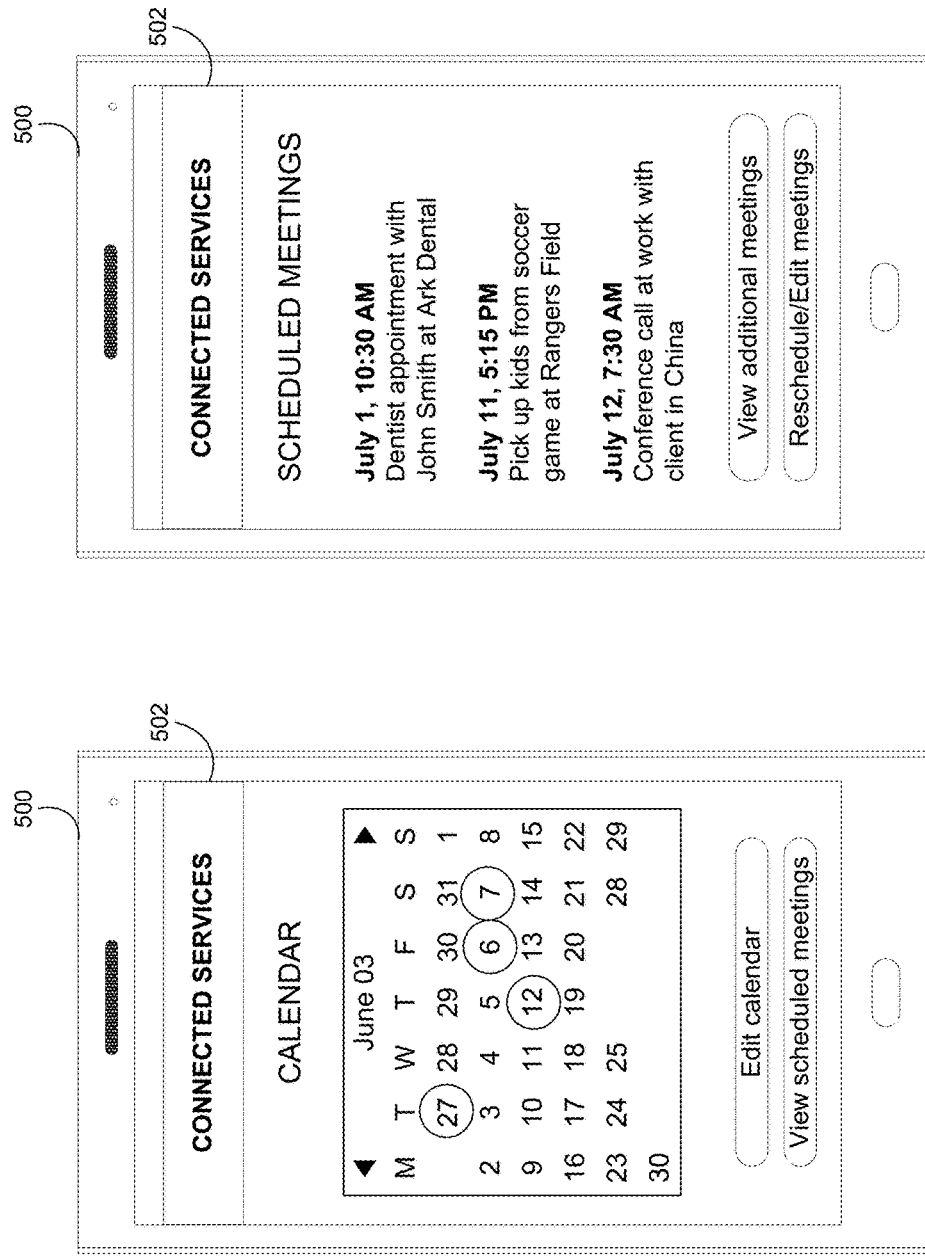
FIGS. 6A and 6B depict example user interfaces of a connected services configurator application in accordance with one or more example embodiments.

FIGS. 6A and 6B illustrate example user interfaces of utilizing a connected services application 502 to view and/or manage information regarding a driver's calendar and scheduled meetings. A driver may be able to navigate to the user interfaces shown in FIGS. 6A and 6B by selecting the "Calendar" and "Scheduled Meetings" options, respectively, shown in the FIG. 5A user interface. The user interface in FIG. 6A may depict a calendar illustrating dates at which the driver may have scheduled meetings, appointments, tasks, or reminders. The driver may be able to select specific days and/or times in his calendar and add, view, or edit appointments scheduled in his or her calendar by selecting the "Edit calendar" option in the FIG. 6A user interface. The connected services application 502 may use the calendar to identify one or more scheduled meetings, meeting locations, and meeting times for the driver and estimate arrival times for a scheduled meeting based on the driver's driving behavior data, vehicle location, and the time corresponding to the vehicle location. The driver may be able to check future scheduled meetings by selecting the "View scheduled meetings" option in the FIG. 6A user interface.

The user interface in FIG. 6B may depict information regarding the driver's scheduled meetings obtained from the driver's calendar (which may be a component of the connected services application 502 or a separate application, such as a calendar in an application that the driver primarily uses to view email, like MICROSOFT OUTLOOK). For example, the user interface in FIG. 6B may provide information regarding each scheduled meeting, including a brief description of each meeting, the meeting location, and the meeting time. The driver may be able to view previous and future scheduled meetings for days, weeks, months, or years and also reschedule or edit upcoming scheduled meetings.

Figures 7A, 7B:
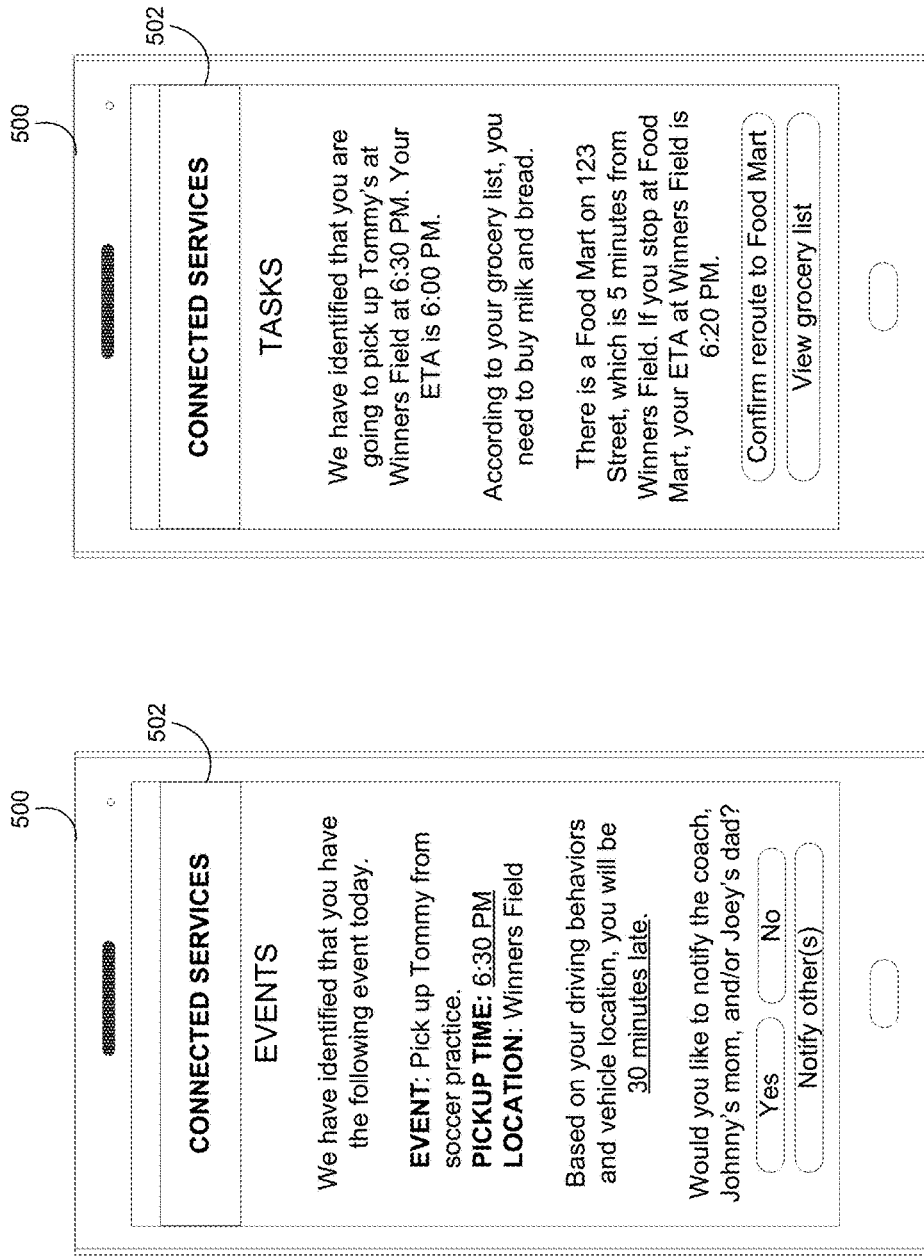
FIGS. 7A and 7B depict example user interfaces of a connected services configurator application in accordance with one or more example embodiments.

FIGS. 7A and 7B illustrate example user interfaces of utilizing a connected services application 502 to view, confirm, edit, and/or manage information regarding a driver's events and tasks. A driver may be able to navigate the user interfaces shown in FIGS. 7A and 7B by selecting the "Events" and "Tasks" options, respectively, shown in the FIG. 5A user interface. The user interface in FIG. 7A may depict an example of what the connected services application 502 may display to a driver after detecting an upcoming event. In some embodiments, the connected services application 502 may provide information to and/or request information from a driver by outputting an audio message to the driver. The driver may be able to interact and engage with the connected services application 502 by speech inputs so that the driver might not have to view or operate (e.g., touch) his or her connected services device 212, telematics device 222, or mobile device 220.

In an example, the connected services application 502 may identify that the driver has an event with a start time (e.g., pickup time) and a specific location. In some cases, the event may include an after-school activity of a child of the driver, such as a soccer practice or soccer game. Based on the driver's driving behavior data, vehicle location, and the current time, the connected services application 502 may determine that the driver will be late to pick up his or her child. The connected services application 502 may identify contact information of one or more people associated with the event (e.g., one or more parents who have a child at the event) and then request confirmation from the driver on whether or not to notify the one or more people. For example, the one or more people associated with the event may include an administrator or coach of the event or one or more parents who will also be picking up their respective children at the event. The driver may respond to the request from the connected services application 502 by accepting or declining to notify the one or more people associated with the event. The notification may indicate the driver's estimated time of arrival, and in some cases, indicate that the driver will be late to the event.

Additionally or alternatively, the notification may request for another person (e.g., another parent at the event) to pick up the child. For example, the event may include a carpool in which the driver may be responsible for picking up other children in addition to his or her own children and dropping off each child at their respective home. The driver may use the connected services application 502 to notify a parent at the event or a spouse of the driver to pick up the child or even stay with the child of the driver. For example, the connected services application 502 may send a notification including a request for at least one of the one or more parents to stay with a child of the driver until the estimated time of arrival. The driver may able to use the connected services application 502 to make sure that another parent or the coach is watching the driver's child and waiting with the driver's child until the driver arrives at the event location.

The user interface in FIG. 7B may depict an example of what the connected services application 502 may display to a driver after identifying where the driver is headed. For example, the connected services application 502 may be able to recognize a route that the driver is taking and determine that the driver is headed to a particular event, such as to a soccer game or soccer practice to pick up his or her child. The connected services application 502 may then calculate the driver's estimated time of arrival at the event location. In some embodiments, the connected services application 502 may be able to determine a driver's estimated time of arrival at an event or a scheduled meeting based on the driver's driving history data. For example, the driving history data may indicate how long it has taken the driver to drive from a current vehicle location to the event location in the past. The connected services application 502 may thus utilize this driving history data, driving behaviors, and driving patterns to calculate a driver's estimated time of arrival.

In some cases, the connected services application 502 may determine that the driver will arrive on time or early for the event and subsequently incorporate reminders and a tasks list of the driver, such as a grocery list or a shopping list. For example, the connected services application 502 may alert a driver that he or she needs to buy milk and bread and may identify a nearby grocery store while the driver is headed to the event location. The connected services application 502 may calculate how long it would take the driver to drive to the grocery store from his or her current vehicle location and how long it would take for the driver to drive from the grocery store to the event location. In some cases, the connected services application 502 may also estimate a period of time that the driver may spend at the grocery store (e.g., based on traffic, parking, walking to the grocery store, finding the groceries, waiting in line, checking out at the grocery store, etc.). The connected services application 502 may utilize these calculations and estimations for determining an updated estimated time of arrival at the event location based on if the driver stops at the nearby grocery store. The driver may choose to confirm or decline the reroute to the nearby grocery store and/or choose to view or edit items on a grocery list through the connected services application 502. By utilizing driving history data, driving behavior data, and driving patterns to calculate a driver's estimated time of arrival, the connected services application 502 may provide context-aware information that overall enhances the driver's user experience.

In additional embodiments, the connected services application 502 may also collect data regarding a vehicle's health (e.g., for diagnosing issues or assessing operating conditions of the vehicle 217), original equipment manufacturer (OEM) recalls, maintenance logs, and the like. The connected services application 502 may utilize the collected data to alert a user regarding one or more services that may be needed, and also to send recommendations regarding suggested repair shops or service providers that may perform the one or more needed services. In some embodiments, the connected services application 502 may be activated (e.g., by one or more sensors 215 in the vehicle 217 or by the telematics device 222) to send an alert to a user and/or to identify a repair needed based on the data collected from the one or more sensors 215 in the vehicle 217. Furthermore, the connected services application 502 may assist users with scheduling repairs (e.g., scheduling repair times and specifying the work or service needed for vehicles) and navigating users to repair shops or service provider locations.

FIGS. 8A and 8B illustrate example user interfaces of utilizing a connected services application 502 to view and/or edit account information and preferences, respectively. A driver may be able to navigate to the user interfaces shown in FIGS. 8A and 8B by selecting the "View Account Information" and "Preferences" options, respectively, shown in the FIG. 5A user interface. The user interface in FIG. 8A depicts example account information corresponding to the driver associated with the vehicle 217. Account information may include an account holder, insured individuals, an insurance policy number, insurance coverage, premiums, deductibles, connected services deductibles, billing information, payment history, and the like. For example, an insurance company may offer connected services to a driver as an additional feature of a specific insurance plan. That is, the driver may purchase an insurance plan and receive connected services, in which the insurance company may offer incentives and discounts to drivers who use the connected services. The driver may be able to update his or her account information associated with his or her insurance plan or connected services by selecting the "Edit information" option in the FIG. 8A user interface.

The user interface in FIG. 8B illustrates examples of settings and preferences associated with the connected services provided by the connected services application 502. That is, the driver may be able to set his or her preferences for syncing the driver's calendar, tasks, and/or reminders with the connected services application 502. The driver may also wish to receive meeting reminders and estimated arrival times automatically for different scheduled meetings in his or her calendar. In another example, the driver may select to notify meeting attendees if he or she is running late by a predetermined period of time (e.g., late by 10 minutes, 30 minutes, an hour, two hours, etc.). In some embodiments, the driver may notify each meeting attendee by email, text message, and/or phone call. In other embodiments, the driver may set his or her preferences to initiate a conference call automatically if he or she is running late to a scheduled meeting. For example, the driver may be able to participate in a conference call for a work meeting from his or her own vehicle while driving to work or while stuck in traffic on the highway. Ultimately, the driver may update the settings and preferences for the connected services application 502 according to his or her personal preferences.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system comprising:
a computing device associated with a driver of a vehicle; and
a server, comprising hardware including a processor and memory, the server configured to:
determine a vehicle location for the vehicle;
parse data regarding a calendar of the driver to identify a scheduled event, an event location, and an event time;
determine, based on the vehicle location and the event location, an estimated time of arrival at which the vehicle is expected to arrive at the event location;
determine, based on a driver preference, whether the estimated time of arrival at the event location is later than a predetermined period of time after the event time;
based on a determination that the estimated time of arrival is later than the predetermined period of time after the event time, evaluate the calendar to determine a time at which the driver is available; and
generate a proposal to reschedule the scheduled event for the time at which the driver is available.

2. The system of claim 1, wherein the estimated time of arrival is determined based on:
driving behavior data collected from a telematics device associated with the vehicle, or
task history data indicating a time it takes to perform a task.

3. The system of claim 1, wherein the server is configured to:
transmit a notification comprising the proposal.

4. The system of claim 1, wherein the server is configured to:
prior to transmitting the proposal, output a request to confirm transmission of the proposal.

5. The system of claim 1,
wherein the computing device comprises a display screen,
wherein the server is configured to display, on the display screen prior to transmitting the proposal, a request to confirm transmission of the proposal.

6. The system of claim 1, wherein the server is configured to:
notify the driver of a particular time that the driver should depart for the scheduled event to arrive at the event location by the event time.

7. The system of claim 1, wherein the computing device comprises a mobile device.

8. An apparatus comprising:
one or more processors; and
a memory storing computer-readable instructions that, when executed by the one or more processors, cause the apparatus to:
determine a vehicle location for a vehicle being driven by a driver;
parse data regarding a calendar of the driver to identify a scheduled event, an event location, and an event time;
determine, based on the vehicle location and the event location, an estimated time of arrival at which the vehicle is expected to arrive at the event location;
determine, based on a driver preference, whether the estimated time of arrival at the event location is later than a predetermined period of time after the event time;
based on a determination that the estimated time of arrival is later than the predetermined period of time after the event time, evaluate the calendar to determine a time at which the driver is available; and
generate a proposal to reschedule the scheduled event for the time at which the driver is available.

9. The apparatus of claim 8, further comprising:
a global positioning system (GPS) receiver,
wherein the vehicle location is determined based on data from the GPS receiver.

10. The apparatus of claim 8, wherein the computer-readable instructions, when executed, cause the apparatus to:
transmit a notification comprising the proposal.

11. The apparatus of claim 8, wherein the computer-readable instructions, when executed, cause the apparatus to:
prior to transmitting the proposal, output a request to confirm transmission of the proposal.

12. The apparatus of claim 8, further comprising:
a display screen,
wherein the computer-readable instructions, when executed, cause the apparatus to display, on the display screen prior to transmitting the proposal, a request to confirm transmission of the proposal.

13. The apparatus of claim 8, wherein the computer-readable instructions, when executed, cause the apparatus to:
notify the driver of a particular time that the driver should depart for the scheduled event to arrive at the event location by the event time.

14. The apparatus of claim 8, wherein the estimated time of arrival is further determined based on driving behavior data associated with the driver.

15. A method comprising:
determining, by a mobile device or server, a vehicle location for a vehicle being driven by a driver;
parsing data regarding a calendar of the driver to identify a scheduled event, an event location, and an event time;
determining, based on the vehicle location and the event location, an estimated time of arrival at which the vehicle is expected to arrive at the event location;
determining, based on a driver preference, whether the estimated time of arrival at the event location is later than a predetermined period of time after the event time;
based on a determination that the estimated time of arrival is later than the predetermined period of time after the event time, evaluating the calendar to determine a time at which the driver is available; and
generating a proposal to reschedule the scheduled event for the time at which the driver is available.

16. The method of claim 15, further comprising:
transmitting a notification comprising the proposal.

17. The method of claim 15, further comprising:
prior to transmitting the proposal, outputting a request to confirm transmission of the proposal.

18. The method of claim 15, further comprising:
displaying, on a display screen of the mobile device prior to transmitting the proposal, a request to confirm transmission of the proposal.

19. The method of claim 15, further comprising:
notifying the driver of a particular time that the driver should depart for the scheduled event to arrive at the event location by the event time.

20. The method of claim 15, wherein the determining the estimated time of arrival comprises determining the estimated time of arrival based on driving behavior data associated with the driver.

* * * * *